United States Patent [19]

Lo

[11] Patent Number: 5,576,733
[45] Date of Patent: Nov. 19, 1996

[54] ERGONOMIC COMPUTER MOUSE

[76] Inventor: Jack Lo, 1415 Eddington La., Daly City, Calif. 94014

[21] Appl. No.: 248,737

[22] Filed: May 25, 1994

[51] Int. Cl.$^6$ .................................................. G09G 3/02
[52] U.S. Cl. ......................................... 345/163; D14/114
[58] Field of Search ...................... 345/163, 164, 345/165, 166, 168, 160, 179, 157; 74/471 XY; 341/20, 22; 400/489, 715; 248/918; 361/680; 401/6–8, 48; 15/436, 435, 438, 443, 444; D14/114, 107

[56] References Cited

U.S. PATENT DOCUMENTS

| | | | |
|---|---|---|---|
| D. 302,426 | 7/1989 | Bradley et al. | D14/114 |
| D. 328,597 | 8/1992 | Clouss | D14/114 |
| 2,498,105 | 2/1950 | Dolan | 401/48 |
| 3,972,628 | 8/1976 | Stevers | 401/48 |
| 4,780,707 | 10/1988 | Selker | 345/163 |
| 4,862,165 | 8/1989 | Gart | 341/20 |
| 4,917,517 | 4/1990 | Ertz | 401/6 |
| 5,137,384 | 8/1992 | Spencer et al. | 400/489 |
| 5,157,381 | 10/1992 | Cheng | 345/163 |
| 5,160,919 | 11/1992 | Mohler et al. | 340/711 |
| 5,287,090 | 2/1994 | Grant | 345/163 |
| 5,296,871 | 3/1994 | Paley | 345/163 |
| 5,355,147 | 10/1994 | Lear | 345/163 |

FOREIGN PATENT DOCUMENTS

| | | | |
|---|---|---|---|
| 413606 | 2/1991 | European Pat. Off. | 345/179 |
| 41435 | 5/1908 | Switzerland | 15/437 |
| 2237160 | 4/1991 | United Kingdom | 273/148 B |
| 2244546 | 12/1991 | United Kingdom . | |

OTHER PUBLICATIONS

Appoint Flashpoint, Guide to Operations, p. 2; Computer Shopper Magazine, May 1994, p. 548; describing operation and showing photo of mouse pen, respectively.
Cadence Magazine, May 1994, p. 74, showing photo of mouse pen.
Microsoft Mouse User's Guide, pp. 2, 22, and 23, showing drawings of the mouse being held by a hand.

*Primary Examiner*—Richard Hjerpe
*Assistant Examiner*—Lun-Yi Lao
*Attorney, Agent, or Firm*—Jack Lo

[57] ABSTRACT

An ergonomic computer mouse includes an upright, primary finger-supporting surface for supporting all of the fingers of an upright hand in straight positions and in an upright stack. It also includes an opposite thumb-supporting surface for supporting the thumb. A hand holding the ergonomic computer mouse will be in a naturally upright and relaxed position, without requiring twisting of the hand, wrist, or forearm. As a result, fatigue, discomfort, and pain are minimized or eliminated even after a long period of continuous use.

17 Claims, 2 Drawing Sheets

5,576,733

ERGONOMIC COMPUTER MOUSE

BACKGROUND OF THE INVENTION

1. Field of the Invention

This invention relates generally to computer peripherals, specifically to an ergonomically shaped computer mouse.

2. Prior Art

Many software programs use movable cursors for selecting data and objects or drawing on a display monitor. The cursors are generally controlled by a manually manipulated pointing device connected to a computer. Common pointing devices include the mouse, trackball, touch pad, and digitizing tablet.

The mouse is the most popular pointing device. It includes a housing that is slidably moved about on a flat, stationary surface. The housing contains a motion sensor on its bottom side for tracking its movement, one to three buttons on its front edge, and electronic circuitry for communicating with an attached computer. When the mouse is moved about, the cursor moves in corresponding directions; and when the buttons are pressed, certain actions can be performed, depending on the software application using the mouse. The internal parts, and electrical and software operations of computer mice are well known in the art.

Most mice, such as the one shown in U.S. Pat. No. D302,426 to Bradley et al., are substantially wider than they are tall, and have generally symmetrical sides so that they can be used by either the right or the left hand. Some mice are specially shaped for providing an optimal fit for a user's right hand. The mouse shown in U.S. Pat. No. D328,597 to Clouss, and sold under the trademark "MouseMan" by Logitech Inc. in Fremont, Calif., has a slightly angled but generally horizontal top surface for supporting the fingers and palm of a right hand. The Microsoft Mouse, Version 2, sold by Microsoft Corporation in Redmond, Wash., includes a concave left side for closely engaging the base of the thumb and palm of a right hand. The mouse shown in U.S. Pat. No. 4,862,165 to Gart includes a surface for supporting some fingers in substantially curled positions. Some ergonomic mice, including the Logitech MouseMan™, are also made in left-handed versions.

All prior art mice have a generally horizontal, primary supporting surface for supporting a hand in a horizontal position, as exemplified by the drawing figures of U.S. Pat. No. 5,157,381 to Cheng, and the drawings in the user's manual of the Microsoft Mouse. However, the most natural and relaxed position for a hand—when placed on a desk by a sitting person—is an upright position: the little finger side of the hand rests on the desk, and the fingers and palm generally define a vertical plane. Therefore prior art mice force the hand, wrist, and forearm to be twisted 80 to 90 degrees out of their natural and relaxed positions, and require constant muscular force to be applied to the hand, wrist, and forearm to maintain their positions. For a three-button mouse, the fore, middle, and ring fingers must be kept in constant tension to prevent them from resting too heavily on the buttons and depressing them inadvertently. A horizontal hand holding a prior art mouse is supported on the desk by only a small area at the wrist on the little finger side, so that a pressure sore may develop thereon. The total effort and discomfort may not seem great at first, but when these mice are used over a prolonged and continuous period of time, users may experience fatigue, discomfort, and even pain in the hand and wrist.

OBJECTS AND SUMMARY OF THE INVENTION

Accordingly the primary object of the present invention is to provide an ergonomic computer mouse which is shaped to allow a hand holding it to remain in a natural, untwisted, and relaxed position. Another object of the invention is to provide an ergonomic computer mouse which minimizes or eliminates fatigue, discomfort, and pain even after prolonged and continuous use. Further objects and advantages of the invention will become apparent from a consideration of the drawings and ensuing description. These and other objects are achieved with an ergonomic computer mouse having an upright finger-supporting surface for supporting a hand in a natural, untwisted, and upright position to minimize or eliminate fatigue and discomfort even after prolonged use. It also includes a thumb-supporting surface for supporting the thumb, one or more buttons arranged on the upright finger-supporting surface, and a motion sensor on a bottom side.

DESCRIPTION OF THE INVENTION

Figure 1:
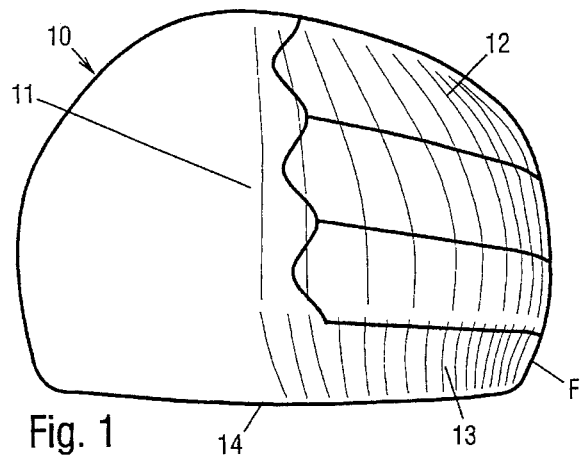
FIG. 1 is a right side view of an ergonomic computer mouse in accordance with a first embodiment of the invention.

In accordance with a first embodiment of the invention shown in the right side view in FIG. 1, a computer mouse includes an ergonomically shaped, upright housing 10 having a generally upright, finger-supporting surface 11 on its right side serving as the primary supporting surface of the mouse. Finger-supporting surface 11 includes three buttons 12 arranged in a generally vertical column on its front portion; although more or fewer buttons can be provided. The lowest button is spaced apart from the bottom edge of housing 10 by a shallow undercut portion 13 that extends from the front F of housing 10 to about its midpoint. Housing 10 is generally rounded, except for a flat bottom side 14 for stably resting on mad sliding over a flat, stationary surface, such as a desk or mouse pad (not shown).

Figure 2:
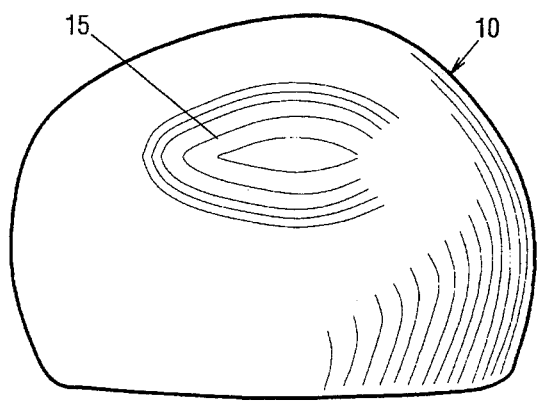
FIG. 2 is a left side view of the ergonomic computer mouse of FIG. 1.

As shown in the left side view of the ergonomic computer mouse in FIG. 2, housing 10 includes a concave, thumb-supporting surface 15 located on the upper half of its left side.

Figure 3:
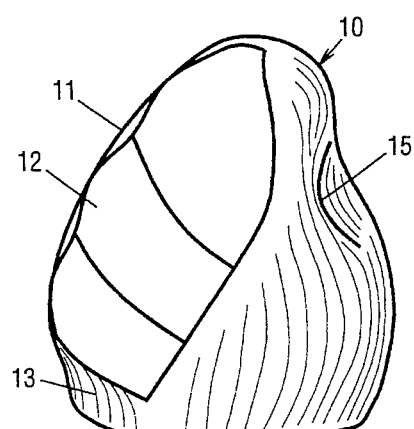
FIG. 3 is a front view of the ergonomic computer mouse of FIG. 1.
Figure 4:
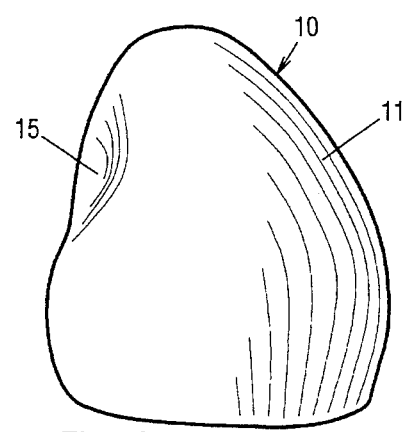
FIG. 4 is a rear view of the ergonomic computer mouse of FIG. 1.
Figure 5:
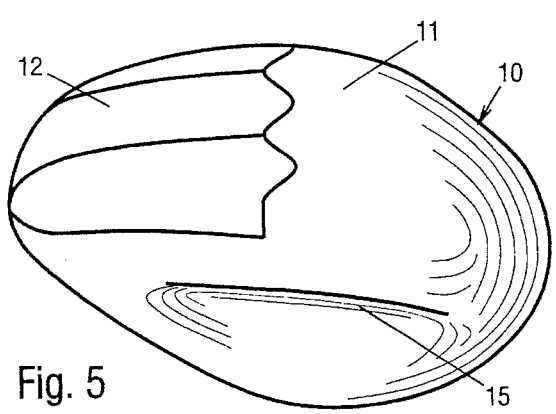
FIG. 5 is a top view of the ergonomic computer mouse of FIG. 1.

Unlike prior art mice, which have a generally horizontal primary supporting surface, the ergonomic computer mouse has a generally upright, primary finger-supporting surface 11, as shown in the front and rear views in FIGS. 3 and 4, respectively. Finger-supporting surface 11 can be slightly more or less vertical than the example shown. FIG. 5 shows a top view of the ergonomic computer mouse.

Figure 6:
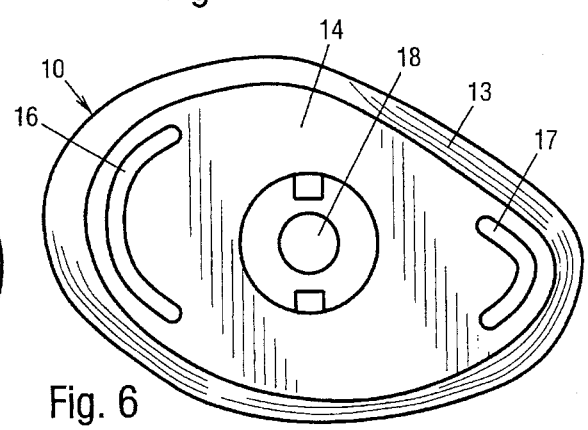
FIG. 6 is a bottom view of the ergonomic computer mouse of FIG. 1.

As shown in the bottom view of the ergonomic computer mouse in FIG. 6, flat bottom side 14 includes feet 16 and 17 made of a conventional low-friction material, such as Teflon™, and a motion sensor 18 for sensing the movement of the mouse over the stationary surface or desk. In the example shown, motion sensor 18 is a conventional ball-type device well known in the art, although other types of suitable motion sensors can also be used.

Figure 7:
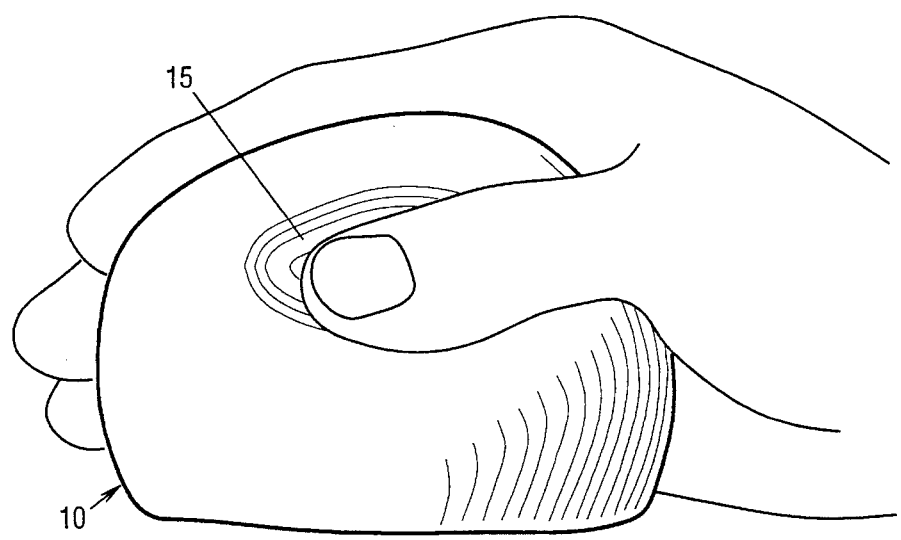
FIG. 7 is a left side view of the ergonomic computer mouse of FIG. 1 held by a right hand.
Figure 8:
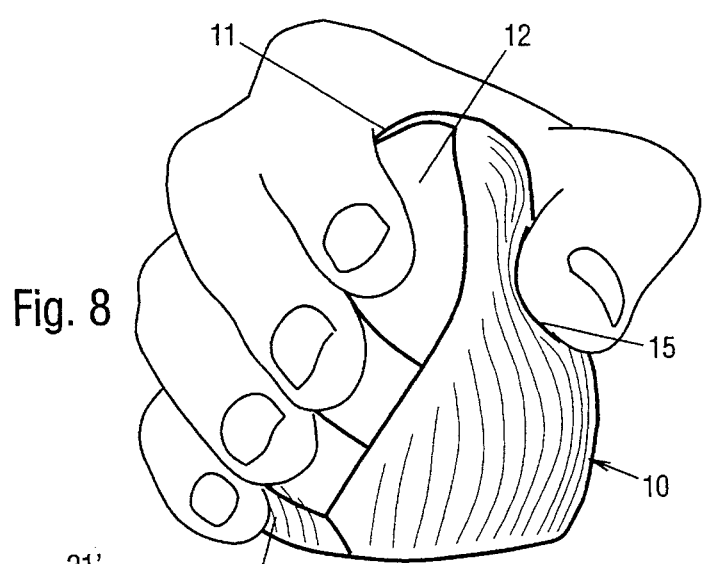
FIG. 8 is a front view of the ergonomic computer mouse of FIG. 1 held by a right hand.

Unlike prior art mice, which are held with a horizontal hand generally parallel to a desk, the ergonomic computer mouse is held with the hand generally upright, as shown in the left side and front views in FIGS. 7 and 8, respectively. Finger-supporting surface 11 is long and tall enough (FIG. 1) to support the four fingers (those other than the thumb) of a right hand in extended, but slightly bent, positions and in a generally upright stack. Concave thumb-supporting surface 15 on the right side supports the thumb. In one embodiment, the mouse is 67 mm high, 95 mm long, and 62 mm wide.

When held in this manner, the mouse can be moved a great distance by moving the hand and arm together, or it can be precisely and finely maneuvered by just flexing the fingers and the thumb. The little finger engages undercut portion 13 so that the mouse can be lifted without slipping. Unlike prior art mice, which are held with a horizontal hand that is supported on the desk by a small area of the wrist on the little finger side, a hand holding the ergonomic mouse has its weight distributed along an entire lower edge thereof. Although the example shown is a right-handed mouse, a left-handed version can be easily made by simply providing a mirror image of it.

Figure 9:
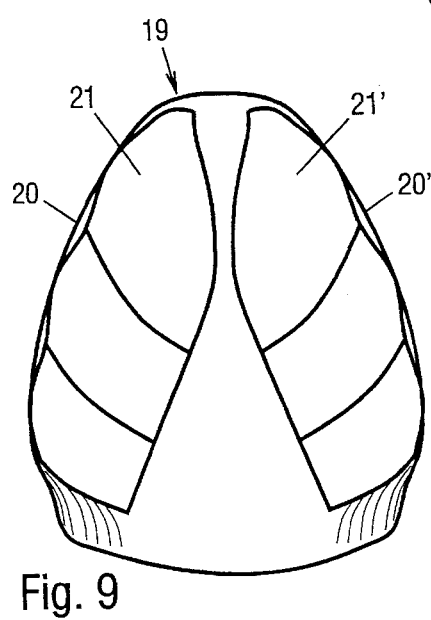
FIG. 9 is a front view of an ergonomic computer mouse in accordance with a second embodiment of the invention.
Figure 10:
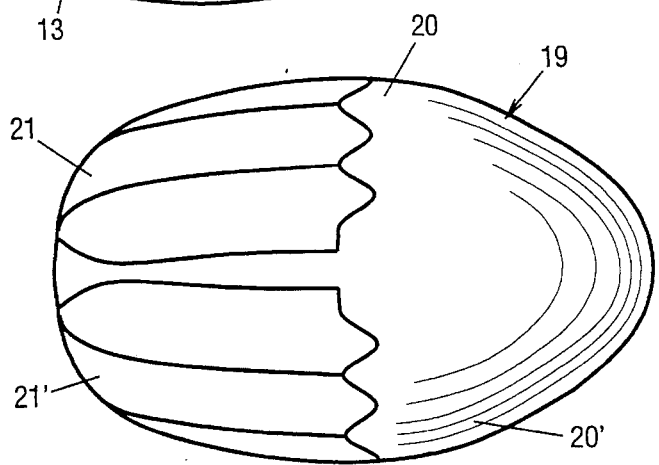
FIG. 10 is a top view of the ergonomic computer mouse of FIG. 9.

In accordance with a second embodiment of the invention shown in the front and top views in FIGS. 9 and 10, respectively, an ergonomic computer mouse includes a housing 19 having symmetrical right and left sides 20 and 20', respectively. When the mouse is held by a right hand, right side 20 serves as a finger-supporting surface to support the fingers that will operate right side buttons 21, while left side 20' serves as a thumb-supporting surface to support the thumb; when the mouse is held by a left hand, the opposite sides and buttons are used. Therefore the second embodiment of the ergonomic mouse can be used by either left or right handed users.

Accordingly the upright shape of the ergonomic computer mouse, in either embodiment, allows the hand holding it to remain in a relaxed and naturally upright position. It eliminates the substantial twisting of the hand, wrist, and forearm that are common to users of prior art mice. The upright hand distributes its weight along its entire lower edge (FIG. 7), which eliminates the pressure sores on the wrist that prior art mice can cause. As a result, fatigue, discomfort, and pain are minimized or eliminated even after a long period of continuous use.

The present invention only relates to the ergonomic aspects of a computer mouse. It can employ any electronic communication and motion sensing technologies well known in the art, or any that may arise in the future.

Although the above descriptions are specific, they should not be considered as limitations on the scope of the invention, but only as examples of the embodiments shown. Many other ramifications and variations are possible within the teachings of the invention. For example, the finger-supporting surface can be somewhat more or less vertical; fewer or more buttons can be provided; and the thumb-supporting surface can be flush with the side of the housing instead of being concave. The mouse can be easily adapted for use with a digitizing tablet by providing it with a cross-hair and suitable electronics well known in the art. The undercut portion can be made taller for engaging both the little finger and the ring or third finger. The overall dimensions of the mouse can be changed for accommodating different hands. Therefore, the scope of the invention should not be determined by the examples given, but only by the appended claims and their legal equivalents.

I claim:

1. An ergonomic computer mouse for translation over a horizontal stationary surface, comprising:

a generally horizontal bottom surface for stably and translatably positioning said mouse over said stationary surface;

a housing attached on top of said bottom surface, said housing having a forward end, a rear end, and opposite sides extending continuously between said forward end and said rear end;

one of said sides being a generally vertical finger-supporting surface for supporting the fingers of a generally upright hand in a generally vertical stack, so that the little finger is at the bottom thereof and the index finger is at the top thereof, said finger-supporting surface being generally elongated in a horizontal direction for supporting the fingers in generally straight positions; and another one of said sides being a thumb-supporting surface for supporting the thumb of said hand, so that said mouse is securely gripped between the thumb and the fingers, and is easily maneuvered by flexing the straight fingers and the thumb, and the hand is in a relaxed, untwisted, and naturally upright position.

2. The computer mouse of claim 1 wherein said finger-supporting surface has a predetermined height for supporting all four fingers in said vertical stack.

3. The computer mouse of claim 1 wherein said finger-supporting surface includes an undercut portion extending along a bottom edge thereof for engaging one of the fingers, so that said mouse can be lifted without slipping.

4. The computer mouse of claim 1, further including a plurality of low-friction feet attached to said bottom surface for allowing said mouse to be easily translated over said stationary surface.

5. The computer mouse of claim 1, further including a button disposed adjacent a front portion of said finger-supporting surface.

6. The computer mouse of claim 1, further including a plurality of buttons disposed in a generally vertical column adjacent a front portion of said finger-supporting surface.

7. The computer mouse of claim 1 wherein said thumb-supporting surface is a mirror image of said finger-supporting surface for forming symmetrical left and right sides, respectively, of said mouse, whereby said mouse can be comfortably held by either a left hand or a right hand.

8. The computer mouse of claim 7, further including a button disposed on each of the sides.

9. An ergonomic computer mouse for translation over a horizontal stationary surface, comprising:

a generally horizontal bottom surface for stably and translatably positioning said mouse over said stationary surface;

a generally vertical finger-supporting surface connected to said bottom surface for supporting the fingers of a generally upright hand in a generally vertical stack, so that the little finger is at the bottom thereof and the index finger is at the top thereof, said finger-supporting surface being generally elongated in a horizontal direction for supporting the fingers in generally straight positions; and a thumb-supporting surface for supporting the thumb of said hand, said thumb-supporting surface being generally parallel to and laterally spaced from said finger-supporting surface, said thumb-supporting surface being positioned no higher than an upper portion of said finger-supporting surface for supporting the thumb no higher than the index finger, so that said mouse is securely gripped between the thumb and the fingers, and is easily maneuvered by flexing the straight fingers and the thumb, and said hand is in a relaxed, untwisted, and naturally upright position.

10. The computer mouse of claim 9 wherein said finger-supporting surface has a predetermined height for supporting all four fingers in said vertical stack.

11. The computer mouse of claim 9 wherein said finger-supporting surface includes an undercut portion extending along a bottom edge thereof for engaging one of the fingers, so that said mouse can be lifted without slipping.

12. The computer mouse of claim 9 wherein said thumb-supporting surface includes a concave portion for generally fitting the contour of said thumb.

13. The computer mouse of claim 9, further including a button disposed adjacent a front portion of said finger-supporting surface.

14. The computer mouse of claim 9, further including a plurality of buttons disposed in a generally vertical column adjacent a front portion of said finger-supporting surface.

15. The computer mouse of claim 9 wherein said thumb-supporting surface is a mirror image of said finger-supporting surface for forming symmetrical left and right sides, respectively, of said mouse, whereby said mouse can be comfortably held by either a left hand or a right hand.

16. The computer mouse of claim 15, further including a button disposed on each of the sides.

17. An ergonomic computer mouse for translation over a horizontal stationary surface, comprising:

a generally horizontal bottom surface for stably and translatably positioning said mouse over said stationary surface;

a generally vertical finger-supporting surface connected to said bottom surface for supporting the fingers of a generally upright hand in a generally vertical stack, so that the little finger is at the bottom thereof and the index finger is at the top thereof, said finger-supporting surface being generally elongated in a horizontal direction for supporting the fingers in generally straight positions; and a thumb-supporting surface laterally spaced from said finger-supporting surface for supporting the thumb of said hand, said thumb-supporting surface including a concave portion for generally fitting the contour of said thumb, so that said mouse is securely gripped between the thumb and the fingers, and is easily maneuvered by flexing the straight fingers and the thumb, and the hand is in a relaxed, untwisted, and naturally upright position.

* * * * *